(12) United States Patent
Isurin et al.

(10) Patent No.: US 7,106,030 B2
(45) Date of Patent: Sep. 12, 2006

(54) FIELD EXCITATION FOR AN ALTERNATOR

(75) Inventors: Alexander Isurin, Dublin, OH (US); Alexander Cook, Dublin, OH (US)

(73) Assignee: Vanner, Inc., Hilliard, OH (US)

(*) Notice: Subject to any disclaimer, the term of this patent is extended or adjusted under 35 U.S.C. 154(b) by 58 days.

(21) Appl. No.: 11/036,068

(22) Filed: Jan. 14, 2005

(65) Prior Publication Data

US 2005/0151515 A1  Jul. 14, 2005

Related U.S. Application Data

(60) Provisional application No. 60/536,328, filed on Jan. 14, 2004.

(51) Int. Cl.
*H02P 9/14* (2006.01)

(52) U.S. Cl. .............. 322/59; 322/28; 363/89

(58) Field of Classification Search ............ 322/28, 322/24, 59, 69; 363/89, 52
See application file for complete search history.

(56) References Cited

U.S. PATENT DOCUMENTS

| | | | |
|---|---|---|---|
| 4,317,165 A | 2/1982 | Sullivan | |
| 4,455,585 A | 6/1984 | Murari et al. | |
| 4,458,195 A | 7/1984 | Piteo | |
| 4,733,159 A * | 3/1988 | Edwards et al. | 323/282 |
| 4,855,888 A | 8/1989 | Henze et al. | |
| 4,992,920 A | 2/1991 | Davis | |
| 5,157,593 A | 10/1992 | Jain | |
| 5,254,936 A * | 10/1993 | Leaf et al. | 322/90 |
| 5,373,196 A | 12/1994 | Faley | |
| 5,452,197 A | 9/1995 | Rice | |
| 5,583,420 A * | 12/1996 | Rice et al. | 322/25 |
| 5,656,922 A * | 8/1997 | LaVelle et al. | 322/46 |
| 5,694,311 A * | 12/1997 | Umeda et al. | 363/89 |
| 5,726,557 A * | 3/1998 | Umeda et al. | 322/21 |
| 5,777,864 A | 7/1998 | Seong et al. | |
| 6,154,375 A | 11/2000 | Majid et al. | |
| 6,483,731 B1 | 11/2002 | Isurin et al. | |
| 6,541,943 B1 * | 4/2003 | Wylie et al. | 322/28 |
| 6,696,820 B1 * | 2/2004 | Peter | 322/24 |

OTHER PUBLICATIONS

A. Isurin, A.Cook, A Novel Resonant Converter Topology and its Application, IEEE Power Electronics Specialists Conference, PESC 2001, vol. 2, pp. 1039-1044, Vancouver, BC, Canada, Jun. 2001.
R. Oruganti, P.C. Heng, J.T.K. Guan, L. A. Choy, Soft-Switched DC/DC Converter with PWM Control, IEEE Transactions on Power Electronics, vol. 13, No. 1, Jan. 1998, pp. 102-113.

(Continued)

*Primary Examiner*—Nicholas Ponomarenko
(74) *Attorney, Agent, or Firm*—Eley Law Firm Co.; James R. Eley; Michael A. Forhan (57) ABSTRACT

A system for controlling the excitation of an alternator field coil. The system comprises a capacitor forming a charge reservoir, a first and a second selectively operable switch connected to opposing ends of a field coil of the alternator, a first catch diode, and a second catch diode. At least one of the first and second switches are operated at a variable duty cycle and the capacitor both absorbs energy from the field coil and supplies energy to the field coil to regulate the magnetic field of the field coil, effective to regulate the output voltage of the alternator and rapidly compensate for changes in at least one load connected to the alternator.

31 Claims, 5 Drawing Sheets

OTHER PUBLICATIONS

G. S. N. Raju, S. Doralda, An LCL Resonant Converter with PWM Control-Analysis, Simulation, and Implementation, IEEE Transactions on Power Electronics, vol. 10, No. 2, Mar. 1995, pp. 164-173.

H. Li, F.Z. Peng, J. Lawler, Modeling, Simulation, and Experimental Verification of Soft-Switched Bi-Directional DC-DC Converters, IEEE Applied Power Electronics Conference and Exposition, APEC 2001, vol. 2, pp. 736-744, Anaheim, CA, Mar. 2001.

N.H. Li, F.Z. Peng, J.S. Lawer, A Natural ZVS Medium-Power Bidirectional DC-DC Converter With Minimun Number of Devices, IEEE Transactions on Industry Applications, vol. 39, No. 2, Mar./Apr. 2003, pp. 525-535.

O. Q. Zhao, Fred C. Lee, High-Efficiency, High Step-Up DC-DC Converters, IEEE Transactions on Power Electronics, vol. 18, No. 1; Jan. 2003, pp. 65-73.

M. Ishida, H. Fujino, T. Hori, Real-Time Output Voltage Control Method of Quasi-ZCS Series Resonant HF-Linked DC-AC Converter, IEEE Transactions on Power Electronics, vol. 10, No. 6, Nov. 1995, pp. 776-783.

G.C. Hsieh, C. H. Lin, J. M. Li, Y. C. Hsu, A Study of Series-Resonant DC/AC Inverter, IEEE Transactions on Power Electronics, vol. 11, No. 4, Jul. 1996, pp. 641-652.

I. Batarseh, Resonant Converter Topologies with Three and Four Energy Storage Elements, IEEE Transactions on Power Electronics, vol. 9, No. 1, Jan. 1994, pp. 64-73.

J. L. Lin, J. S. Lew, Robust Controller Design for a Series Resonant Converter Via Duty-Cycle Control, IEEE Transactions on Power Electronics, vol. 14, No. 5, Sep. 1999, pp. 793-801.

* cited by examiner

PRIOR ART

FIELD EXCITATION FOR AN ALTERNATOR

This application claims priority to U.S. provisional application 60/536,328, filed Jan. 14, 2004, the contents of which are hereby incorporated by reference.

FIELD

The present invention relates generally to vehicle electrical systems and, more particularly, to a system for controlling the excitation of an alternator field coil.

BACKGROUND

There is a desire on the part of vehicle manufacturers to increase the electrification of vehicle auxiliary loads by reducing the number of engine accessories that depend directly on the fueled-engine as a prime mover. Examples include the vehicle's power steering pump, hydraulic drives, engine cooling fan, air conditioning compressor, oil and coolant pumps, and air compressors. An advantage of accessory electrification is reduced engine loading, which facilitates greater engine performance, increased flexibility in locating the accessories, reduced fuel consumption, more efficient accessory operation, and reduced vehicle emissions.

In addition to engine accessories, many vehicles include ancillary electrical accessories directed to the mission of the vehicle and/or comfort of the vehicle's occupants. For example, an emergency vehicle includes exterior emergency lighting, heating, ventilation and air conditioning ("HVAC"), interior lights, radios and medical equipment. Many trucks, such as long-haul transport tractor-trailer semis, include radios, exterior and interior lights, and a sleeper compartment having a variety of household appliances such as televisions and microwaves that are operable from AC power supplied by a DC-to-AC inverter.

Vehicle electrical systems typically include one or more batteries comprising an electrical power supply, with an engine-driven alternator being employed to augment and charge the battery. A particular problem of such systems is that the loading of the system and, consequently, the alternator output constantly changes as various engine and ancillary accessories are switched on and off. The output of the alternator, which varies in proportion to the load on the electrical system and the discharge of the battery, responds relatively slowly to the changes in loading due to the inductive time constant of the field and stator coils of the alternator. This can adversely affect the voltage regulation of the vehicle's electrical system. For example, if a high-power exterior light is switched on, the increased loading of the electrical system causes the electrical system voltage to decrease until the alternator eventually responds by increasing its output voltage. Conversely, when a load is switched off, the electrical system voltage may surge to a higher level than is desirable until the alternator output is reduced. The slow response of the alternator to changing load conditions thus results in relatively poor electrical system voltage regulation. This problem is exacerbated when a number of accessories are randomly switched on and off at any given time. There is a need to improve an alternator's response to varying load conditions within a vehicle's electrical system.

SUMMARY

An aspect of the present invention is to provide a system for rapidly compensating for changes in power demand of a variable load connected to an alternator. The alternator has a voltage source that includes an output and an electrical common, a field coil, a stator coil magnetically coupled to the field coil, and a three-phase rectifier. The variable load is connected to the rectifier. The system comprises a capacitor connected between the output of the voltage source and the common, forming a charge reservoir. A first selectively operable switch is connected between the charge reservoir and a first end of the field coil. A second selectively operable switch is connected between the common and a second end of the field coil. A first catch diode has its anode connected to the common and its cathode connected to the first end of the field coil. A second catch diode has its cathode connected to the charge reservoir and its anode connected to the second end of the field coil. At least one of the first and second switches is operated at a determinable variable duty cycle. The capacitor both absorbs energy from the field coil and supplies energy to the field coil to regulate the magnetic field of the field coil, effective to regulate the output voltage of the three-phase rectifier and rapidly compensate for changes in the power demand of at least one load connected to the three-phase rectifier.

Another aspect of the present invention is to provide a system for rapidly compensating for changes in power demand of a load connected to an alternator. The alternator has a voltage source that includes an output and an electrical common, a field coil, a stator coil magnetically coupled to the field coil, and a three-phase rectifier connected to the stator. The variable load is connected to the rectifier. The system comprises a capacitor connected between the output of the voltage source and the common, forming a charge reservoir. A first selectively operable switch is connected between the charge reservoir and a first end of the field coil. A second selectively operable switch is connected between the common and a second end of the field coil. A first catch diode has its anode connected to the common and its cathode connected to the first end of the field coil. A second catch diode has its cathode connected to the charge reservoir and its anode connected to the second end of the field coil. A controller monitors the load and controls the actuation of the first and second switches. At least one of the first and second switches are operated by the controller at a determinable variable duty cycle. The capacitor both absorbs energy from the field coil and supplies energy to the field coil to regulate the magnetic field of the field coil, effective to regulate the output voltage of the three-phase rectifier and rapidly compensate for changes in at least one load connected to the three-phase rectifier, such that the output of the alternator is increased when the load is increased, and decreased when the load is decreased.

Yet another aspect of the present invention is a method for controlling the excitation of an alternator having a voltage source that includes an output and an electrical common, a field coil, a stator coil magnetically coupled to the field coil, a three-phase rectifier connected to the stator, and a variable load connected to the rectifier. The method comprises the steps of forming a charge reservoir by connecting a capacitor between the output of the voltage source and the common and selectively operating a first switch connected between the charge reservoir and a first end of the field coil. The method also includes the steps of selectively operating a second switch connected between the common and a second end of the field coil and connecting an anode of a first catch diode to the common, and connecting a cathode of the first catch diode to the first end of the field coil. Additional steps include connecting a cathode of a second catch diode to the charge reservoir, and connecting an anode of the second catch diode to the second end of the field coil, and operating at least one of the first and second switches at a determinable variable duty cycle such that the capacitor both absorbs energy from the field coil and supplies energy to the field coil to regulate the magnetic field of the field coil, effective to regulate the output voltage of the three-phase rectifier and rapidly compensate for changes in at least one load connected to the three-phase rectifier.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1:
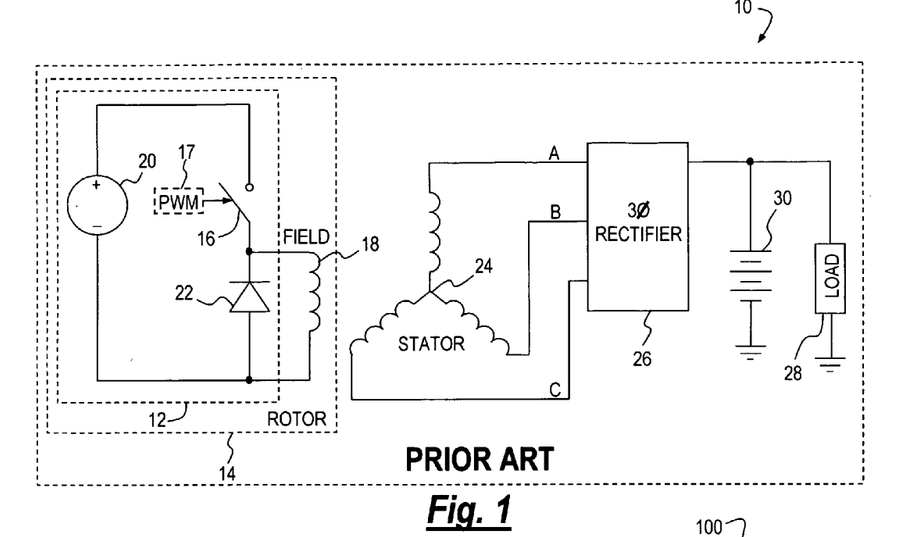
FIG. 1 is a schematic diagram of a typical prior art alternator system.

A typical prior art alternator system 10 is shown in FIG. 1. Alternator system 10 includes a buck-type switching converter field excitation stage 12 and a rotor 14. A conventional electrical switch 16, such as a transistor, field effect transistor or solid state relay is switched open and closed (i.e., OFF and ON respectively) by a pulse-width modulator 17 in a predetermined manner to periodically interrupt electrical current supplied to a field coil 18 by a voltage source 20. A catch diode 22 is placed in parallel with field coil 18 to circulate current in the field coil when switch 16 is open. A three-phase stator 24 is magnetically coupled to field coil 18. Rotation of field coil 18 by a prime mover such as an engine (not shown) causes the field coil to periodically couple to a set of windings A-B-C of stator 24, thus generating a three-phase alternating current in the stator. The three-phase electrical voltage present at windings A-B-C is coupled to a three-phase ("3Ø") rectifier 26 that converts the three-phase AC voltage to direct current ("DC") voltage. The DC output of rectifier 26 augments power supplied to one or more loads 28 of the vehicle's electrical system by a battery 30. The output of rectifier 26 also charges battery 30.

In operation, the PWM ON versus OFF time duty cycle of switch 16 may be varied from 0% to 100% to vary the current in field coil 18 and thus regulate the rectified voltage output of rectifier 26. The duty cycle of switch 16 depends upon the amount of power being produced by voltage source 20, which may be provided by stator 24 or battery 30, and also depends upon the demand placed on system 10 by load 28. If the amount of power being consumed by load 28 is low, the duty cycle of switch 16 is reduced to reduce the output of stator 24 and, consequently, rectifier 26. Conversely, if the demand of load 28 increases, the duty cycle of switch 16 is likewise increased to increase the output of stator 24 and thus rectifier 26.

One disadvantage of the prior art circuit of FIG. 1 is its relatively slow response to changing load 28 conditions and alternator output. When the vehicle's engine RPM changes from idle to operation (or from operation to idle) the current capacity output of alternator 10 changes in direct proportion to the engine speed. As alternator current capacity changes, the duty cycle of switch 16 must change to compensate as field excitation stage 12 tries to regulate the output of alternator 10 by increasing or decreasing the amount of energy in field coil 18. The time constants inherent in field 18 and stator 24 cause a time lag in response to load changes, resulting in a variation of as much as about 25% in the voltage output by rectifier 26, typically for as long as about a second. Furthermore, if battery 30 is not present in the circuit to absorb these variations, the voltage on the output circuit of the alternator 10 can vary as much as 50% from its nominal voltage, causing high stresses on connected loads 28. Variations in the demand of load 28 produces a similar voltage variation in the output of alternator 10.

Figure 2:
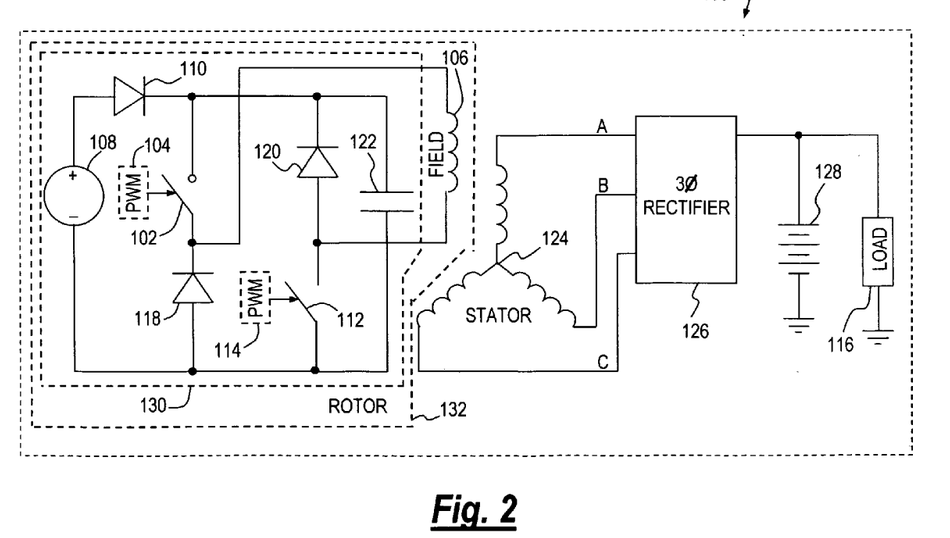
FIG. 2 is a schematic diagram of an alternator system according to an embodiment of the present invention.

Referring now to FIG. 2, an alternator system 100 is depicted according to an embodiment of the present invention. A first electronic switch 102 such as, without limitation, a transistor, field effect transistor, solid-state relay or other power semiconductor, is switched by a first conventional pulse-width modulator 104 at a duty cycle varying from 0–100% to periodically interrupt electrical current supplied to a first end of a field coil 106 by a voltage source 108, via a blocking diode 110. Blocking diode 110 is optional and may be used to apply an increased reverse voltage to coil 106 when it is desirable to reduce the current flowing in the coil due to a reduction in loading of system 100, such as removal of a load, as discussed in further detail below.

A second electronic switch 112 is connected to a second end of field coil 106. Second electronic switch 112 may be, without limitation, a transistor, field effect transistor, solid-state relay or other power semiconductor. Second electronic switch 112 is kept substantially closed by a second pulse width modulator 114 for normal operation and is opened only as needed to minimize voltage transients in alternator system 100 during periods of load change, such as removal of a load 116. A first and a second catch diode 118, 120 act to circulate current through field coil 106 when one or both of switches 102, 112 are open. A capacitor 122 acts to smooth the voltage supplied by voltage source 108 via blocking diode 110. Capacitor 122 also absorbs energy from, and supplies energy to, field coil 106 as discussed in more detail below.

A three-phase stator 124 is magnetically coupled to field coil 106. Rotation of field coil 106 by a prime mover such as an engine (not shown) causes the field coil to periodically couple to a set of windings A-B-C of stator 124, thus generating a three-phase alternating current in the stator. The three-phase electrical voltage present at windings A-B-C is coupled to a three-phase rectifier 126 which converts the three phase AC voltage to DC voltage. The DC output of rectifier 126 augments power supplied to one or more loads 116 of the vehicle's electrical system by a battery 128. The output of rectifier 126 also charges a battery 128.

Figure 3:
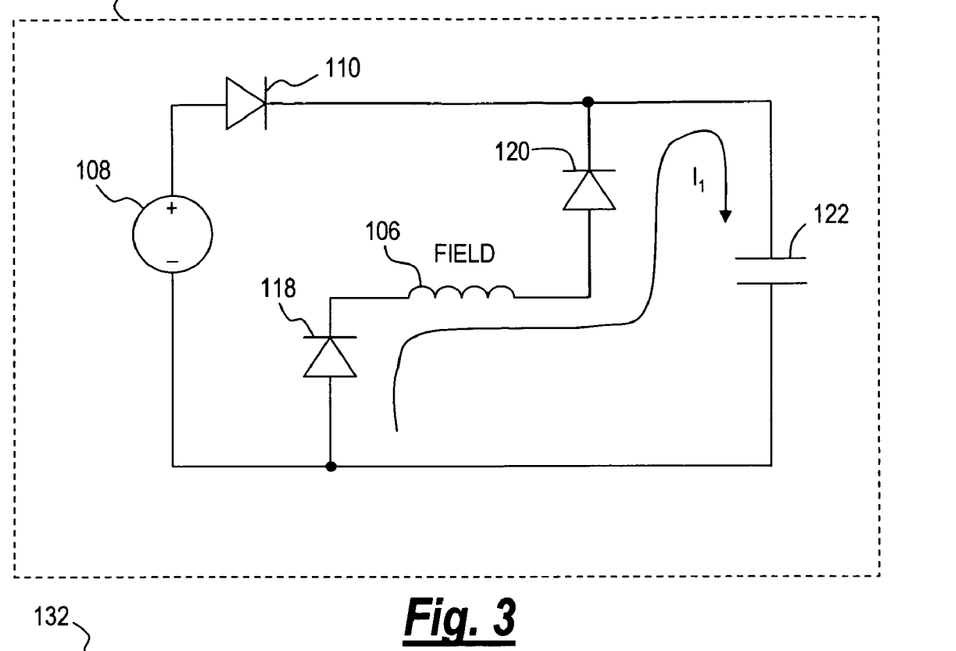
FIG. 3 illustrates the predominant current flow in a rotor portion of the alternator system of FIG. 2 when the alternator load undergoes a reduction in loading.
Figure 4:
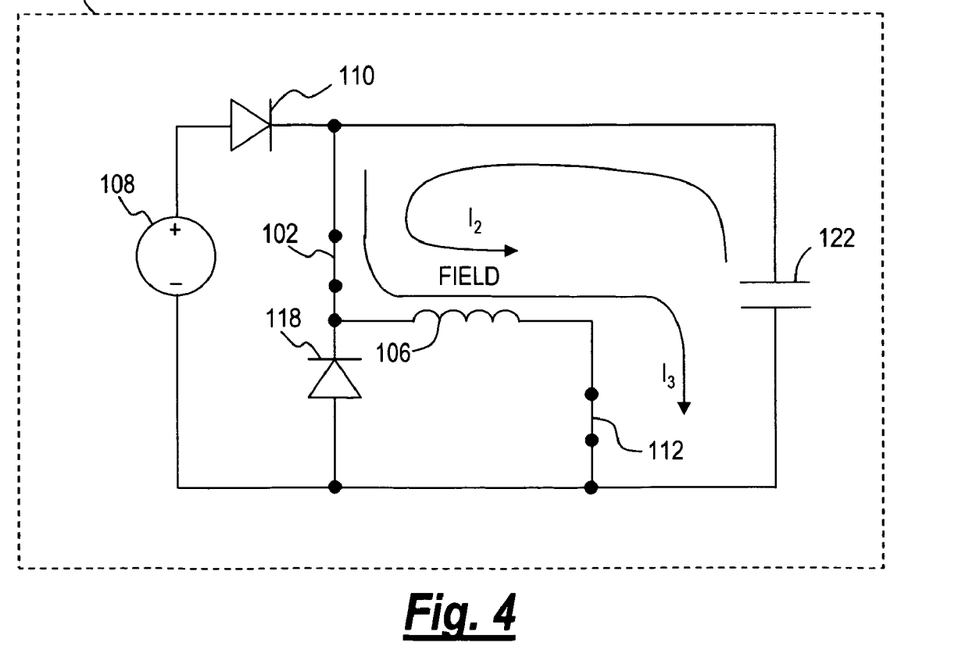
FIG. 4 illustrates the predominant current flow in a rotor portion of the alternator system of FIG. 2 when the alternator is loaded, for a first switch-setting condition.
Figure 5:
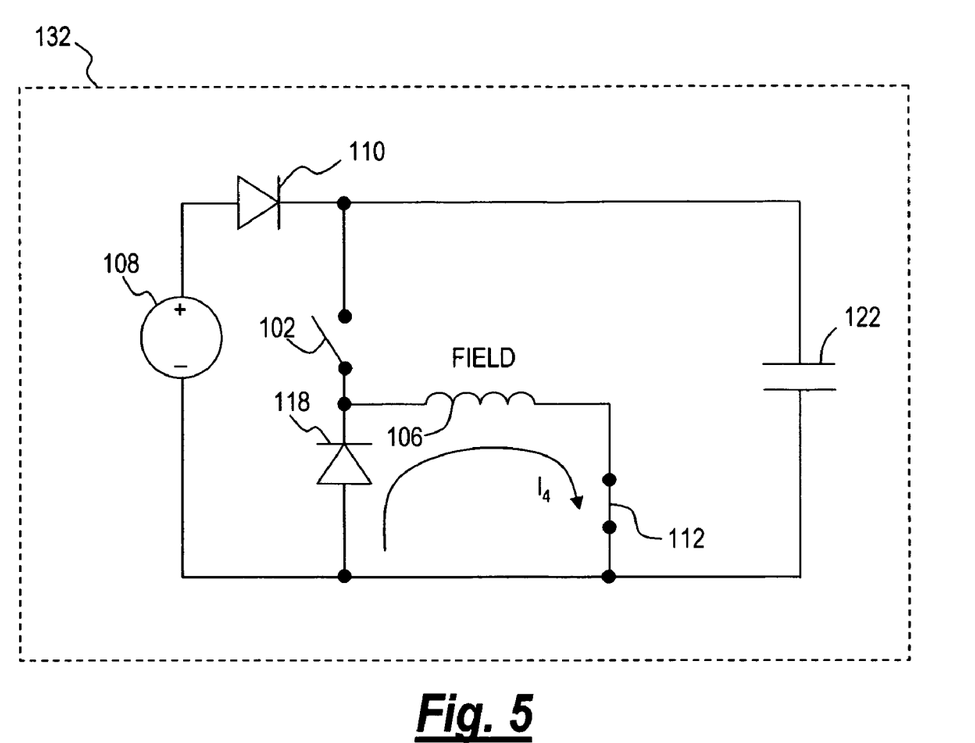
FIG. 5 shows the predominant current flow in a rotor portion of the alternator system of FIG. 2 when the alternator is loaded, for a second switch-setting condition.

With reference to FIGS. 2, 3 and 4, operation of a power stage portion 130 of a rotor 132 in system 100 will now be described. When load 116 changes from a heavier to a lighter load, inductive energy present in field coil 106 is conducted to capacitor 122 by diodes 118 and 120, as indicated by current flow arrow $I_1$. This action minimizes the circulating current in rotor 132 and reduces the response time of a regulator 200 (discussed below) which varies the duty cycles of PWM 104, 114 to control the current in field coil 106. Controlling the current in field coil 106 in turn controls and regulates the voltage supplied to battery 128 and load 116 by stator 124. When switches 102 and 112 are closed the energy stored in capacitor 122 is consumed in a subsequent regulation cycle, as shown by current flow $I_2$ in FIG. 4. Current flow in coil 106 is also supplied by voltage source 108 via blocking diode 110 when switches 102 and 112 are closed, as indicated by current arrow $I_3$ in FIG. 4. Likewise, when switch 102 is open and switch 112 is closed, current flows through diode 118 and field coil 106, as shown by current arrow $I_4$ in FIG. 5. At least one of switches 102, 112 is operated at a determinable variable duty cycle such that capacitor 122 both absorbs energy from field coil 106 and supplies energy to the field coil to regulate the magnetic field of the field coil, effective to regulate the output voltage of three-phase rectifier 126 and rapidly compensate for changes in the power demand of at least one load 116 connected to the three-phase rectifier.

With continued reference to FIG. 2, in a second embodiment of the present invention, switch 102 may be actuated by pulse width modulator 104, producing a duty cycle normally varying from about 50–100%. Switch 112 may be likewise actuated by pulse width modulator 114, producing a duty cycle varying from about 50–100% and synchronous with switch 102. Under certain conditions, such as a small load 116, the duty cycle of switches 102 and 112 may vary over a range of about 0%–100%.

Figure 6:
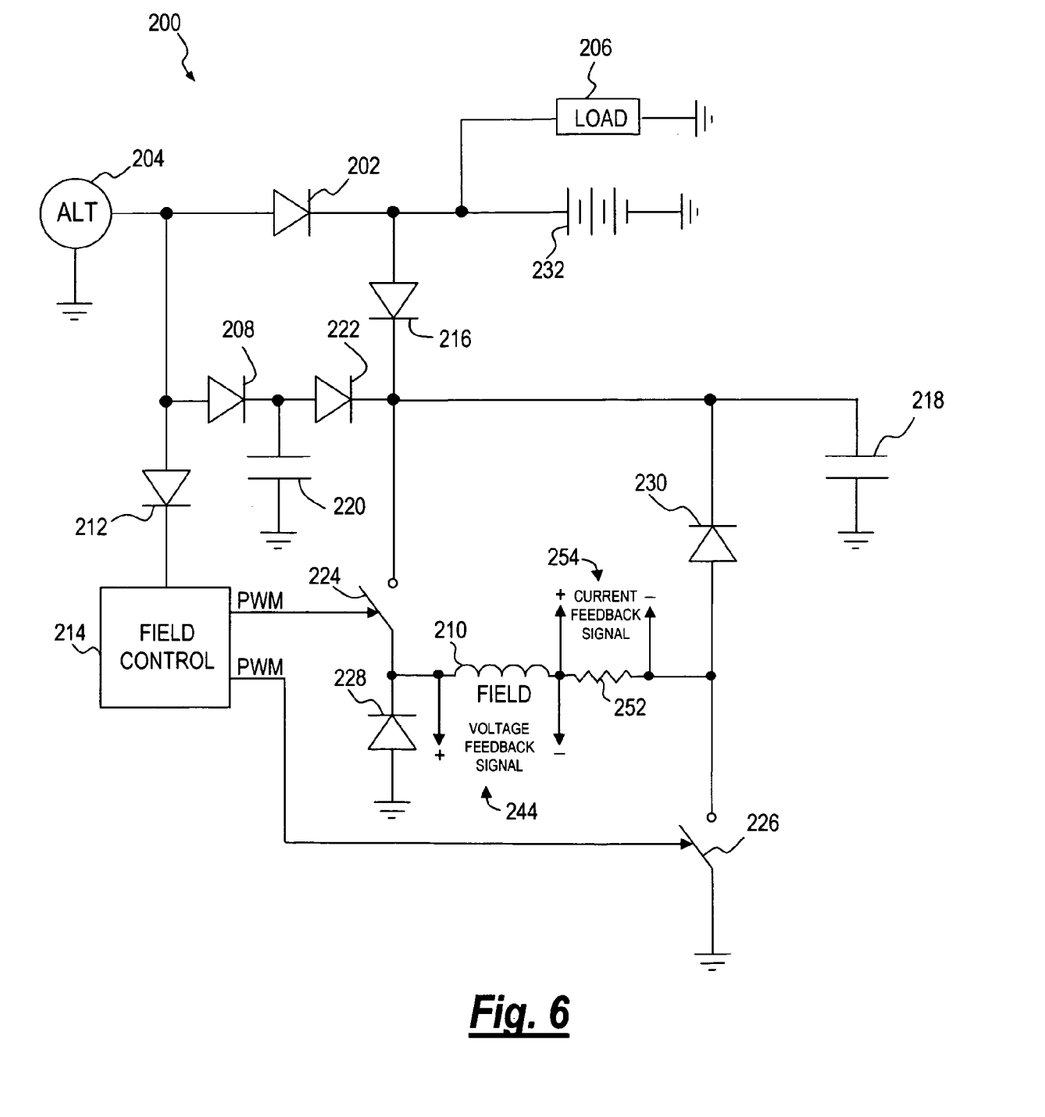
FIG. 6 is a schematic circuit diagram of a field excitation control for the system of FIG. 2 according to an embodiment of the present invention.

Referring now to FIG. 6, a simplified schematic diagram of a field coil control circuit 200 according to an embodiment of the present invention is shown therein. A first diode 202 provides electrical power from a voltage source 204 to a load 206, while a second diode 208 provides power to a field coil 210. A third diode 212 provides voltage sensing to a controller 214. A fourth diode 216 provides a starting current for field 210. A first capacitor 218 compensates for changes in demand by load 206. A second capacitor 220 also compensates for load demand changes, as detailed below. A fifth diode 222, used to supply electrical current to a first switch 224, may optionally be additionally used as a voltage suppressor to clamp voltage spikes present at the first switch and thus protect the first switch from damage due to the spikes. The current in field coil 210 is limited by the maximum voltage across capacitor 220, switch 224, a second switch 226, and a sixth and a seventh diode, 228, 230, respectively. If the voltage of capacitor 218 is about twice or higher than the nominal voltage of field 210, then the result will be a faster response time when the demand of load 206 changes.

Under normal operating conditions diodes 208 and 222 are conducting, and the voltages across capacitors 218 and 220 are relatively close, having only a diode 222 forward-bias junction voltage drop of about 0.7 to 1.0 volts between them. When load 206 reduces, it is necessary to reduce the current in field 210 in order to maintain a regulated output voltage provided to a battery 232. If the load 206 removal occurs quickly, then the stored energy in field coil 210 must be removed quickly. This is accomplished by turning off switches 224 and 226. Field coil 210 then begins to discharge into capacitor 218, causing the voltage across the capacitor to increase. This reverse-biases diode 222, effectively disconnecting capacitor 220 from the field 210. The maximum voltage across capacitor 218 (and hence the switches and diodes) is determined by the amount of energy stored in field 210 and capacitor 218. The time it takes to discharge the energy in field 210 (which gives the response time of the alternator regulation loop, and hence determines the response time of the system) is determined by the discharge voltage. The field 210 may optionally be discharged more quickly into a higher voltage source, but this requires the use of components in control circuit 200 having correspondingly higher voltage ratings.

Figure 7:
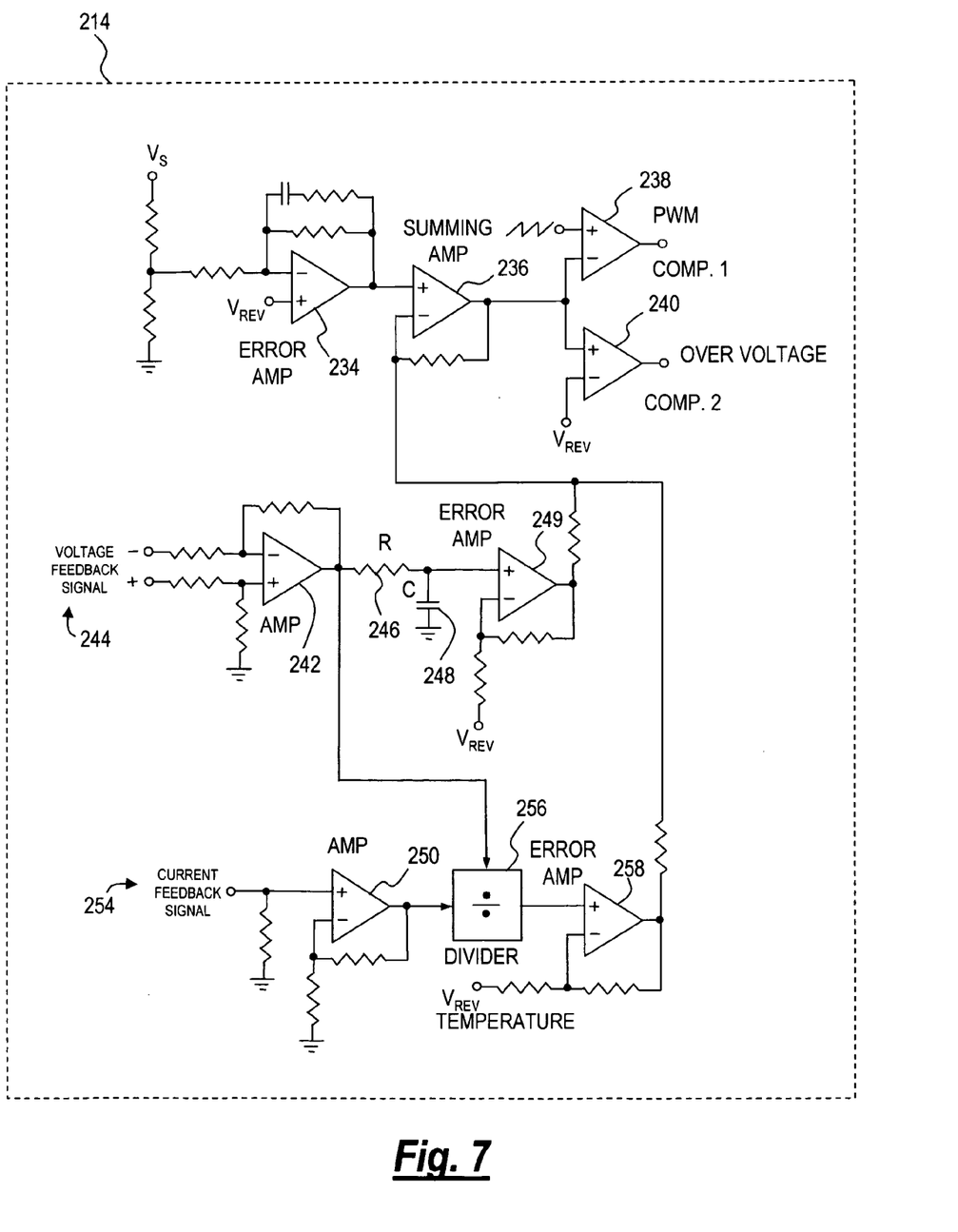
FIG. 7 is a schematic circuit diagram of a controller portion of the control of FIG. 6 according to an embodiment of the present invention.

With continued reference to FIG. 6, details of the operation of field controller 214 are depicted in FIG. 7. A first error amplifier 234 provides a control setting for the output voltage of alternator 204 by providing a signal that is proportional to the difference between an alternator output voltage setpoint and the measured alternator voltage. The output of error amplifier 234 is coupled to the input of a summing amplifier 236. The output of summing amplifier 236 is then coupled to a PWM comparator 238 and an over-voltage comparator 240. PWM comparator 238 may actuate one or both of switches 224, 226. Alternatively, a separate similarly-configured PWM comparator (not shown) may be used such that switches 224 and 226 are separately driven.

A voltage feedback amplifier 242 amplifies signals from a voltage sensor identified as "voltage feedback signal" 244 signal in FIG. 6. Amplifier 242 provides a controlled voltage across field coil 210 by adjusting the PWM duty cycle of switches 224, 226. The voltage across coil 210 may be higher than the voltage present for a nominal load 206 when an overload occurs for a time set by the RC time constant of a resistor 246 and a capacitor 248. After capacitor 248 is sufficiently charged by amplifier 242, the voltage across field coil 210 is limited by an error amplifier 249 to a predetermined value, thus limiting the amount of current delivered by alternator 204.

A current feedback amplifier 250 amplifies signals from current sensor 252 in field coil 210, identified as "current feedback signal" 254 in FIG. 6. The output signal of amplifier 250 is coupled to divider circuit 256 along with the output from voltage feedback amplifier 252. As a result, divider circuit 256 provides an output voltage signal that is proportional to the impedance of field 210. The impedance of field 210 is in turn proportional to the temperature of the field. This proportional signal is coupled to an error amplifier 258. If the temperature of field 210 exceeds a threshold value, the voltage supplied to the field will be reduced by the output of amplifier 258, which is coupled to PWM 238 through summing amp 236. As a consequence, the power output from alternator 204 is reduced, allowing the temperature of the alternator to drop.

With reference to FIGS. 6 and 7, in operation controller 214 monitors load 206 and controls the actuation of switches 224, 226 by varying the duty cycle of the switches in a determinable manner corresponding to a duty cycle necessary to adjust the output of alternator 204 to compensate for changes in the load. In general, the output of alternator 204 is increased when the demand of load 206 is increased, and decreased when the load is decreased. Field coil 210 provides controller 214 with a field coil voltage feedback signal 244 corresponding to the voltage across coil 210. Similarly, a sensor 252 provides controller 214 with a current feedback signal 254 corresponding to the current in field coil 210. Controller 214 is responsive to the voltage and current feedback signals 244, 254 and rapidly adjusts the current in field coil 210 to a level corresponding to the levels of the voltage and current feedback signals by adjusting the duty cycle of switches 224, 226 such that the output of alternator 204 that is applied to load 206 is substantially regulated. A divider circuit 256 provides an output signal corresponding to the impedance of field coil 210. Controller 214 monitors the output of divider circuit 256 and reduces the duty cycle of switches 224, 226 when the impedance of field coil 210 exceeds a predetermined threshold value corresponding to the maximum safe operating temperature of field coil 210.

While this invention has been shown and described with respect to a detailed embodiment thereof, it will be understood by those skilled in the art that changes in form and detail thereof may be made without departing from the scope of the claims of the invention.

What is claimed is:

1. In an alternator having a voltage source that includes an output and an electrical common, a field coil, a stator coil magnetically coupled to the field coil, a three-phase rectifier connected to the stator, and a variable load connected to the rectifier, a system for rapidly compensating for changes in power demand of the load comprising:
   a capacitor connected between the output of the voltage source and the common, forming a charge reservoir;
   a first selectively operable switch connected between the charge reservoir and a first end of the field coil;
   a second selectively operable switch connected between the common and a second end of the field coil;
   a first catch diode, having its anode connected to the common and its cathode connected to the first end of the field coil; and
   a second catch diode, having its cathode connected to the charge reservoir and its anode connected to the second end of the field coil,
   wherein at least one of the first and second switches is operated at a determinable variable duty cycle and the capacitor both absorbs energy from the field coil and supplies energy to the field coil to regulate the magnetic field of the field coil, effective to regulate the output voltage of the three-phase rectifier and rapidly compensate for changes in the power demand of at least one load connected to the three-phase rectifier.

2. The system of claim 1 wherein the charge reservoir is connected to the voltage source through a blocking diode arranged such that an anode of the blocking diode is connected to the voltage source and a cathode of the diode is connected to the capacitor.

3. The system of claim 1 wherein the duty cycle of the first switch is varied between about 0% and 100% and the second switch is kept substantially closed.

4. The system of claim 1 wherein the duty cycle of the first and second switches each varies between about 50% and 100% and the first switch is actuated synchronously with the second switch.

5. The system of claim 1 wherein the duty cycle of the first and second switches each varies between about 0% and 100% and the first switch is actuated synchronously with the second switch.

6. The system of claim 1, further comprising a controller to monitor the load and control the actuation of the first and second switches to adjust the output of the alternator to compensate for changes in the load.

7. The system of claim 6 wherein the output of the alternator is increased when the load is increased, and decreased when the load is decreased.

8. The system of claim 6, further comprising a field coil voltage feedback signal.

9. The system of claim 8, further comprising a field coil current feedback signal.

10. The system of claim 9 wherein the controller is responsive to the voltage and current feedback signals and adjusts the current in the field coil to a level corresponding to the levels of the voltage and current feedback signals.

11. The system of claim 10, further comprising a divider circuit that provides an output signal corresponding to the impedance of the field coil.

12. The system of claim 11 wherein the controller reduces the duty cycle of the first and second switches when the impedance of the field coil exceeds a threshold value.

13. In an alternator having a voltage source that includes an output and an electrical common, a field coil, a stator coil magnetically coupled to the field coil, a three-phase rectifier connected to the stator, and a variable load connected to the rectifier, a system for rapidly compensating for changes in power demand of the load comprising:
   a capacitor connected between the output of the voltage source and the common, forming a charge reservoir;
   a first selectively operable switch connected between the charge reservoir and a first end of the field coil;
   a second selectively operable switch connected between the common and a second end of the field coil;
   a first catch diode, having its anode connected to the common and its cathode connected to the first end of the field coil;
   a second catch diode, having its cathode connected to the charge reservoir and its anode connected to the second end of the field coil, and
   a controller to monitor the load and control the actuation of the first and second switches,
   wherein at least one of the first and second switches are operated by the controller at a determinable variable duty cycle and the capacitor both absorbs energy from the field coil and supplies energy to the field coil to regulate the magnetic field of the field coil, effective to regulate the output voltage of the three-phase rectifier and rapidly compensate for changes in power demand of at least one load connected to the three-phase rectifier, such that the output of the alternator is increased when the load is increased, and decreased when the load is decreased.

14. The system of claim 13 wherein the charge reservoir is connected to the voltage source through a blocking diode arranged such that an anode of the blocking diode is connected to the voltage source and a cathode of the diode is connected to the capacitor.

15. The system of claim 13, further comprising a field coil voltage feedback signal.

16. The system of claim 15, further comprising a field coil current feedback signal.

17. The system of claim 16 wherein the controller is responsive to the voltage and current feedback signals and adjusts the current in the field coil to a level corresponding to the levels of the voltage and current feedback signals.

18. The system of claim 17, further comprising a divider circuit that provides an output signal corresponding to the impedance of the field coil.

19. The system of claim 18 wherein the controller reduces the duty cycle of the first and second switches when the impedance of the field coil exceeds a threshold value.

20. A method for controlling the excitation of an alternator having a voltage source that includes an output and an electrical common, a field coil, a stator coil magnetically coupled to the field coil, a three-phase rectifier connected to the stator, and a variable load connected to the rectifier comprising the steps of:

forming a charge reservoir by connecting a capacitor between the output of the voltage source and the common;

selectively operating a first switch connected between the charge reservoir and a first end of the field coil;

selectively operating a second switch connected between the common and a second end of the field coil;

connecting an anode of a first catch diode to the common, and connecting a cathode of the first catch diode to the first end of the field coil, connecting a cathode of a second catch diode to the charge reservoir, and connecting an anode of the second catch diode to the second end of the field coil; and operating at least one of the first and second switches at a determinable variable duty cycle such that the capacitor both absorbs energy from the field coil and supplies energy to the field coil to regulate the magnetic field of the field coil, effective to regulate the output voltage of the three-phase rectifier and rapidly compensate for changes in at least one load connected to the three-phase rectifier.

21. The method of claim 20, further comprising the step of connecting the charge reservoir to the voltage source through a blocking diode arranged such that an anode of the blocking diode is connected to the voltage source and a cathode of the diode is connected to the capacitor.

22. The method of claim 20, further comprising the steps of varying the duty cycle of the first switch between about 0% and 100% and keeping the second switch substantially closed.

23. The method of claim 20, further comprising the steps of varying the duty cycle of each of the first and second switches between about 50% and 100% and synchronously actuating the first and second switches.

24. The method of claim 20, further comprising the steps of varying the duty cycle of each of the first and second switches between about 0% and 100% and synchronously actuating the first and second switches.

25. The method of claim 20, further comprising the step of adding a controller to monitor the load and control the actuation of the first and second switches to adjust the output of the alternator to compensate for changes in the load.

26. The method of claim 25, further comprising the step of increasing the output of the alternator when the load is increased, and decreasing the output of the alternator when the load is decreased.

27. The method of claim 25, further comprising the step of monitoring the voltage of the field coil.

28. The system of claim 27, further comprising the step of monitoring the current of the field coil.

29. The method of claim 28, further comprising the steps of monitoring the voltage and current of the field coil and adjusting the current in the field coil to a level corresponding to the voltage and current feedback signals.

30. The method of claim 29, further comprising the step of producing an output signal corresponding to the impedance of the field coil.

31. The method of claim 30, further comprising the step of reducing the duty cycle of the first and second switches when the impedance of the field coil exceeds a threshold value.

* * * * *